US009646452B2

(12) United States Patent
Parra et al.

(10) Patent No.: US 9,646,452 B2
(45) **Date of Patent: *May 9, 2017**

(54) GAME HISTORY FOR WAGERING GAMES USING HANDHELD DEVICES

(71) Applicant: Bally Gaming, Inc., Las Vegas, NV (US)

(72) Inventors: Jacqueline F. Parra, Glen Ellyn, IL (US); Jesse M. Smith, Chicago, IL (US); Craig J. Sylla, Round Lake, IL (US); Brian L. Yarger, Arlington Heights, IL (US)

(73) Assignee: BALLY GAMING, INC., Las Vegas, NV (US)

( * ) Notice: Subject to any disclaimer, the term of this patent is extended or adjusted under 35 U.S.C. 154(b) by 291 days.

This patent is subject to a terminal disclaimer.

(21) Appl. No.: 14/299,700

(22) Filed: Jun. 9, 2014

(65) Prior Publication Data

US 2014/0364217 A1 Dec. 11, 2014

Related U.S. Application Data

(60) Provisional application No. 61/832,550, filed on Jun. 7, 2013.

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |
| ***G07F 17/32*** | (2006.01) |

(52) U.S. Cl.
CPC ...... *G07F 17/3209* (2013.01); *G07F 17/3211* (2013.01); *G07F 17/3218* (2013.01); *G07F 17/3272* (2013.01)

(58) Field of Classification Search
USPC .............................. 463/9, 26, 31, 34, 39, 42
See application file for complete search history.

(56) References Cited

U.S. PATENT DOCUMENTS

| | | | |
|---|---|---|---|
| 6,906,700 B1 | 6/2005 | Armstrong | |
| 7,927,216 B2 | 4/2011 | Ikeda et al. | |
| 8,164,567 B1 | 4/2012 | Barney et al. | |
| 8,169,406 B2 | 5/2012 | Barney et al. | |
| 8,460,103 B2 | 6/2013 | Mattice et al. | |
| 8,491,389 B2 | 7/2013 | Weston et al. | |
| 8,542,105 B2 | 9/2013 | Grant et al. | |
| 8,674,932 B2 | 3/2014 | Armstrong | |
| 8,707,216 B2 | 4/2014 | Wilson | |
| 2009/0054123 A1 * | 2/2009 | Mityagin | ................ A63F 13/12 463/9 |
| 2009/0280910 A1 | 11/2009 | Gagner et al. | |

(Continued)

*Primary Examiner* — Adetokunbo O Torimiro
(74) *Attorney, Agent, or Firm* — DeLizio Law, PLLC

(57) ABSTRACT

A computerized method includes presenting a community game on a display device of a wagering game system that comprises a wagering game machine associated with a handheld device for use in conducting the community game, wherein the presenting of the community game comprises presenting movements of a game element in response to movements of the handheld device. The computerized method includes, at periodic time intervals during the community game, storing, in a memory device, data indicating a current position of the handheld device.

26 Claims, 10 Drawing Sheets

(56) References Cited

U.S. PATENT DOCUMENTS

| | | | | |
|---|---|---|---|---|
| 2009/0286601 | A1 | 11/2009 | Rubio et al. | |
| 2011/0034239 | A1* | 2/2011 | Collette | G07F 17/32 463/26 |
| 2011/0086706 | A1* | 4/2011 | Zalewski | A63F 13/12 463/36 |
| 2011/0144983 | A1* | 6/2011 | Salazar | G10H 1/366 704/207 |
| 2012/0075168 | A1* | 3/2012 | Osterhout | G02B 27/017 345/8 |
| 2013/0274016 | A1* | 10/2013 | Gagner | G07F 17/3211 463/34 |
| 2014/0235343 | A1* | 8/2014 | Kelly | G07F 17/3211 463/31 |
| 2014/0370971 | A1* | 12/2014 | Kelly | G07F 17/3225 463/25 |

* cited by examiner

GAME HISTORY FOR WAGERING GAMES USING HANDHELD DEVICES

RELATED APPLICATIONS

This application claims the priority benefit of U.S. Provisional Application Ser. No. 61/832,550 filed Jun. 7, 2013.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2014, WMS Gaming, Inc.

FIELD

Embodiments of the inventive subject matter relate generally to wagering game systems, and more particularly to maintaining game history in wagering games using handheld devices.

BACKGROUND

Operators of wagering game machines ("operators"), e.g., casino operators, typically maintain game history for wagering game machines. For example, operators may utilize a server or other mechanism to monitor and store game events during game play (e.g., button presses, bets, credit balances, intermediate results, final game results, etc.) on the wagering game machines. Operators can use the game events to reproduce games and verify results. In some cases, operators may access game history for dispute resolution (e.g., if a player disputes the results of a wagering game). However, operators may use game history for other purposes, such as to reconstruct games that were interrupted due to power loss, power surges, hardware/software failure, track mode play, etc. In some instances, wagering game machines can use the game history to attract players by replaying wagering games when the machines are not being used.

BRIEF DESCRIPTION OF THE FIGURES

Embodiments of the invention are illustrated in the Figures of the accompanying drawings in which.

DESCRIPTION OF THE EMBODIMENTS

This description of the embodiments is divided into eight sections. The first section provides an introduction to some embodiments, while the second section provides a system environment. The third section describes example games and awards. The fourth section describes example operating environments, and the fifth section describes example operations performed by some embodiments. The sixth section describes an example wagering game machine architecture. The seventh section describes an example wagering game machine and the eighth section presents some general comments.

Introduction

This section provides an introduction to some embodiments.

Some wagering game machines are configured as a group or bank of machines. A bank of wagering game machines can offer community games for multiple players at the bank. For example, a bank of wagering game machines can share a common display device (e.g., overhead) for community games. These community games are generally triggered by random events during base games at the wagering game machines.

Some embodiments include handheld devices that receive player input during community games. In some instances, every wagering game machine in a bank has an associated handheld device. Accordingly, each player can use (e.g., hold, position, move, etc.) a handheld device to play community games. The handheld devices can provide unique experiences for each player involved in the community games.

Various embodiments maintain a game history that includes movement and activity related to the handheld devices. For example, some embodiments can record the position of the handheld device at periodic intervals of the community game. The position can include the location and orientation of the handheld device in three-dimensional space. In some embodiments, the movement of the handheld devices can be recorded at periodic time intervals independent of game events of the community game. Accordingly, in contrast to only recording in response to game events, the recording at periodic intervals allows for a finer granularity for tracking the positions of the handheld devices.

In addition to position and movement information, the game history can also include inputs (e.g., button presses) received from the handheld devices. Output to the handheld devices can also be recorded as part of the game history. For example, output to the handheld devices can include lighting, vibration, and rumbling of the handheld devices.

Embodiments can use the game history to replay community games. Additionally, some embodiments can replay community games without playback of multimedia (e.g., video) frames recorded during the live game play. These and other embodiments are further described below.

System Environment

Figure 1:
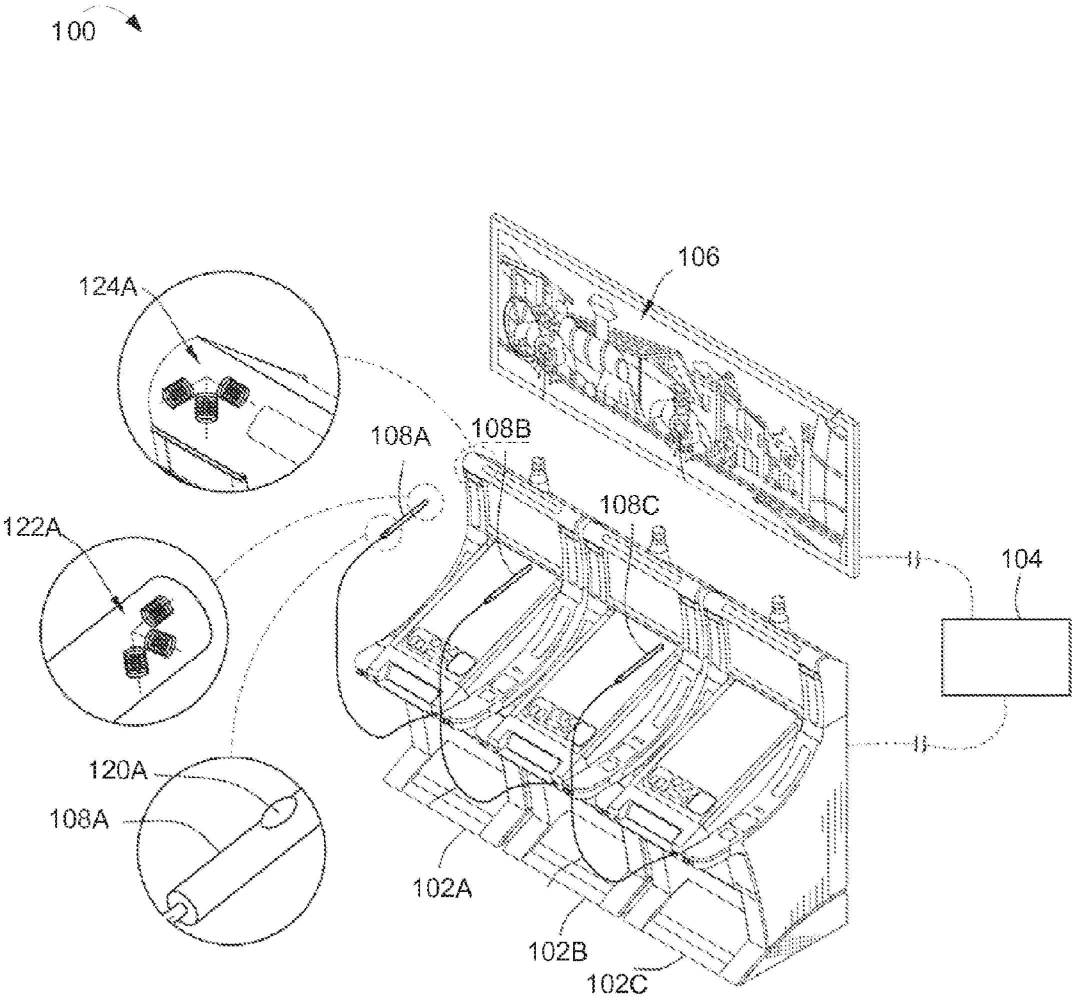
FIG. 1 depicts a wagering game system having a bank of wagering game machines and a community display for displaying a community game, according to some embodiments.
Figure 2:
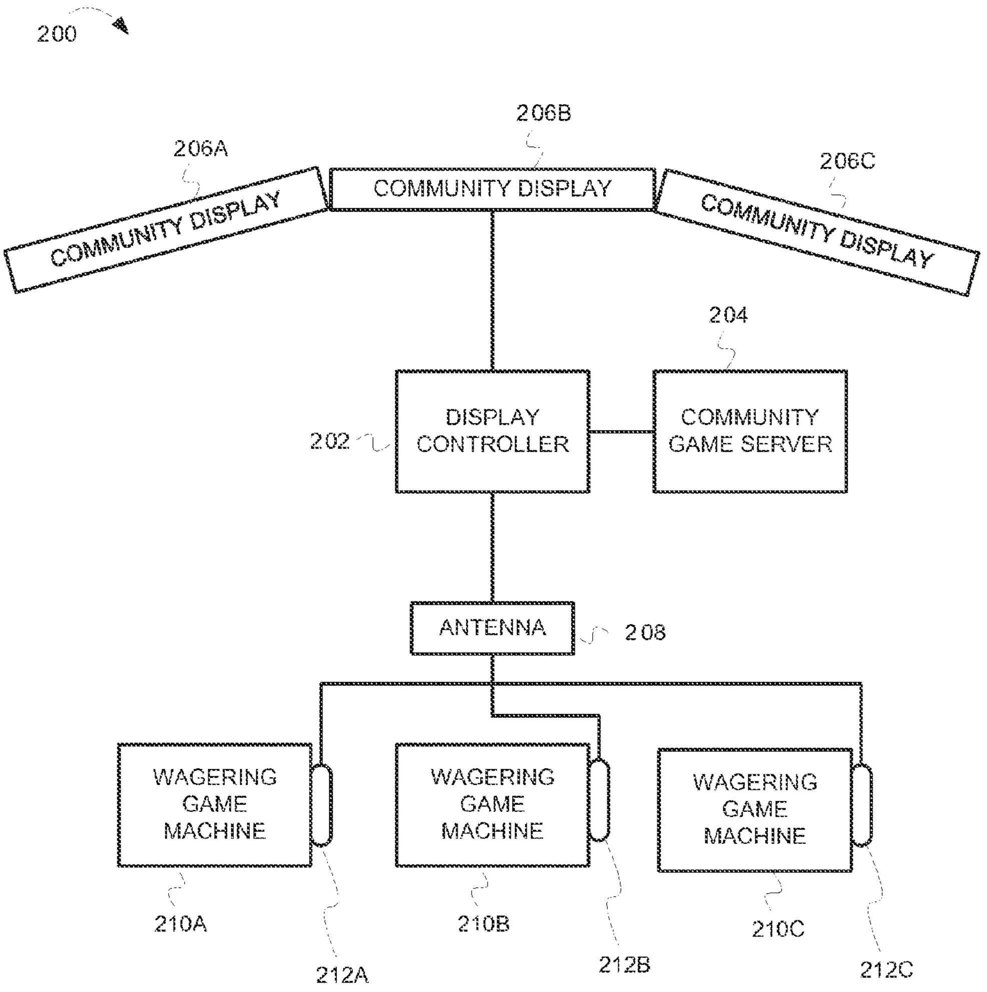
FIG. 2 depicts a more detailed block diagram of a wagering game system that allows for recording of handheld device activity used in community games and for community game replay, according to some embodiments.
Figure 4:
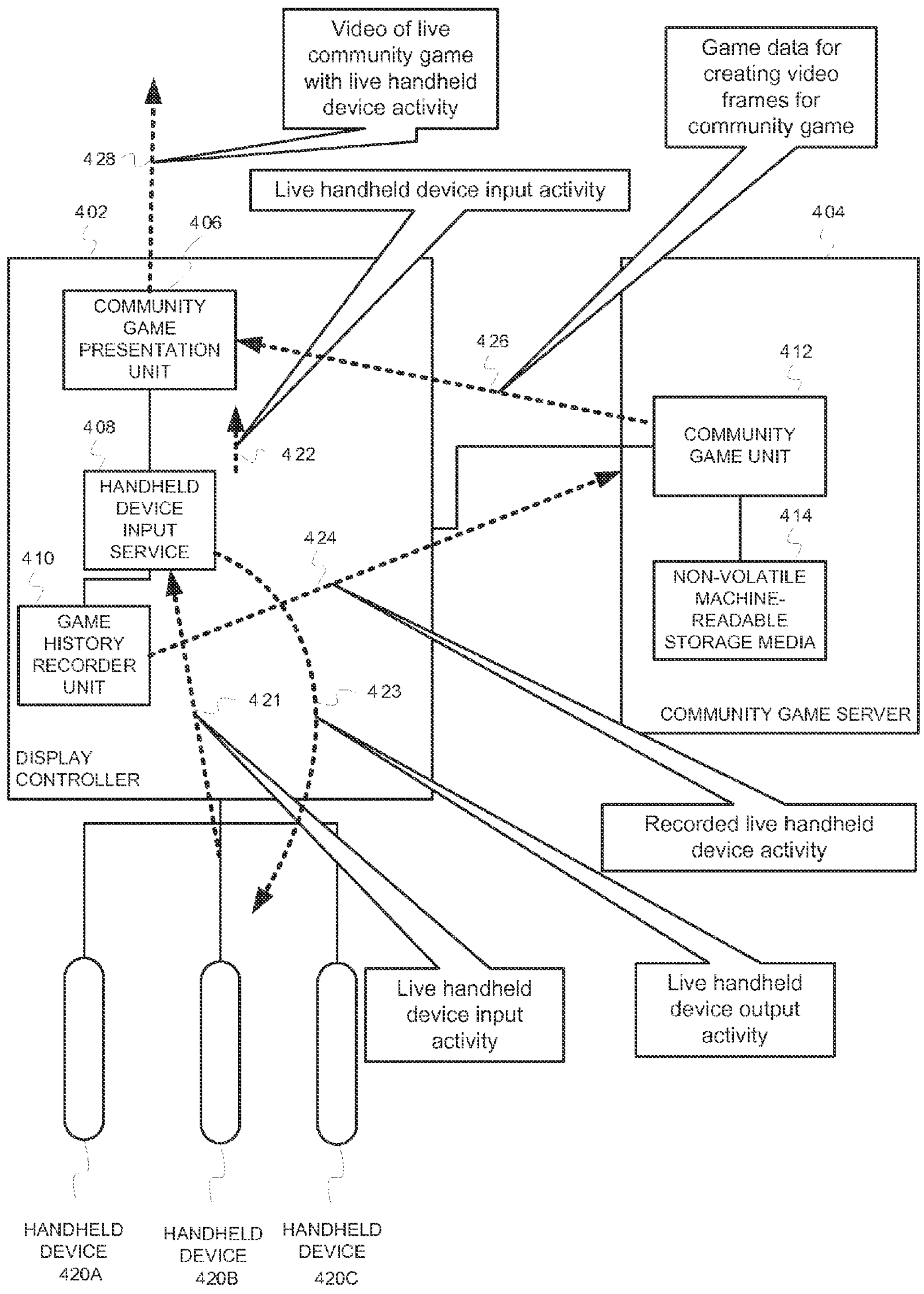
FIG. 4 depicts a more detailed block diagram of a display controller and a community game server for recordation of handheld device activity occurring during a community game, according to some embodiments.
Figure 5:
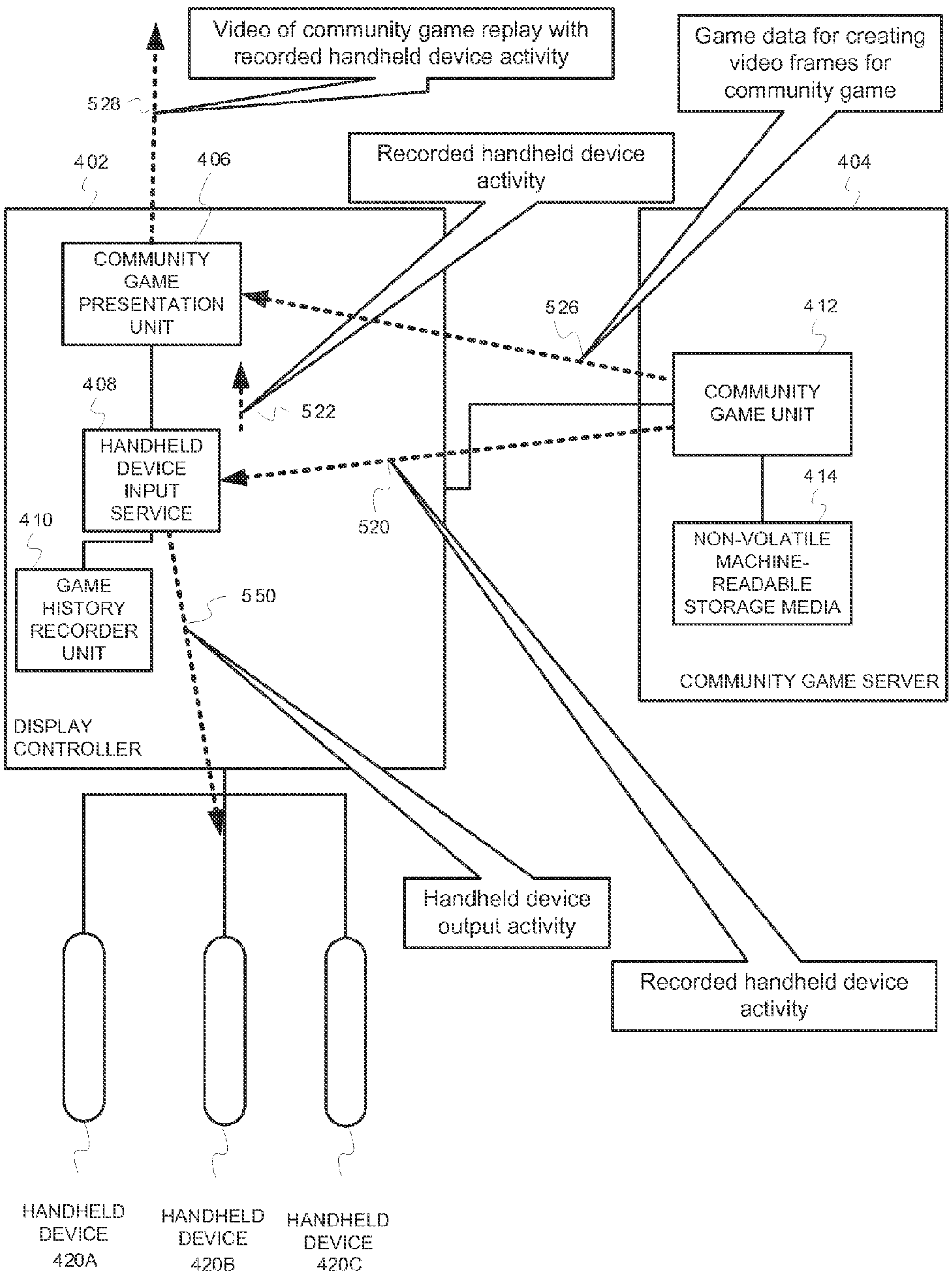
FIG. 5 depicts the block diagram of FIG. 4 during replay of a community game, according to some embodiments.
Figure 8:
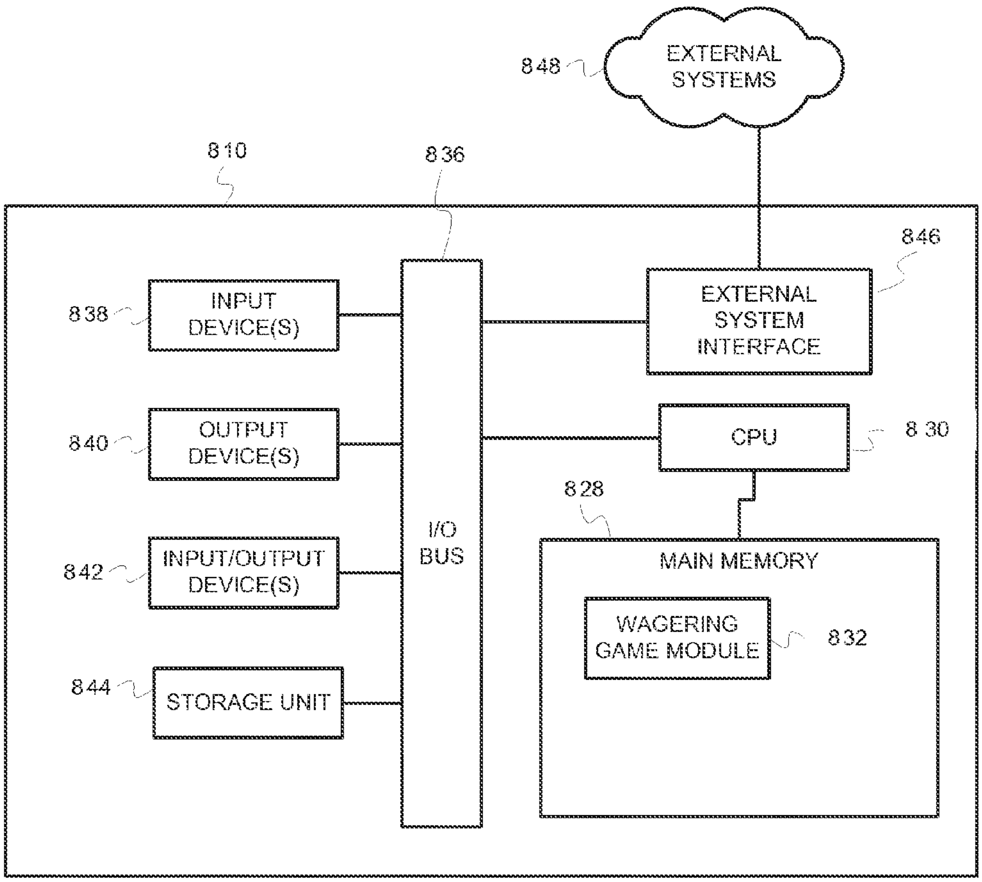
FIG. 8 depicts a block diagram illustrating a wagering game machine architecture, according to some example embodiments.

FIG. 1 depicts a wagering game system having a bank of wagering game machines and a community display for displaying a community game, according to some embodiments. A wagering game system 100 includes a bank of wagering game machines that include wagering game machines 102A-102C. The wagering game machines 102A-102C are communicatively coupled together. An example architecture of the wagering game machines 102A-102C is depicted in FIG. 8, which is described in more detail below. The architecture of the wagering game machines 102A-102C can include a processor that is communicatively coupled to a community game controller 104, which is communicatively coupled to a community display 106. The community game controller 104 can separated into different logic blocks or devices. For example, the community game controller 104 can include a display controller and a community game server. Examples of a display controller and a community game server are depicted in FIGS. 2 and 4-5, which are described in more detail below.

The wagering game system 100 also includes handheld devices 108A-108C. The handheld device 108A is associated with the wagering game machine 102A. The handheld device 108B is associated with the wagering game machine 102B. The handheld device 108C is associated with the wagering game machine 102C. Players at the wagering game machines 102A-102C can use the handheld devices 108A-108C to provide input to and receive output from the wagering game play. For example, the players can use the handheld devices 108A-108C during a community game to select objects being displayed on the community display 106 for prize selection.

The community display 106 is presenting a community game to players at the wagering game machines 102A-102C. The community game can include features not available to machines outside the bank. For example, as described herein, the community game can include a free spin feature that awards a community free spin award to all players at the wagering game machines 102A-102C. Other embodiments of the community game can give cash awards (e.g., selected from different levels of cash awards), basic credit awards and variations of the basic credit awards. Any of these features can be randomly selected by the community game controller 104 for inclusion in a community game.

In various embodiments, the community game controller 104 records a game history of a community game. The game history can include movement (including current position) and activity related to the handheld devices 108A-108C. In some embodiments, the community game controller 104 can record movement and activity related to the handheld devices 108A-108C at periodic intervals. For example, the community game controller 104 can record movement and activity of the handheld devices 108A-108C eight times per second, four times per second, 16 times per second, etc. during the community game.

Each position can include a location and an orientation of an associated handheld device 108A-108C in three-dimensional space.

The periodic intervals at which recording of game history occurs can be independent of events that occur in the community game. In other words, events in the community game do not trigger recording of positions of the handheld devices 108A-108C. Instead, irrespective of community game events, some embodiments record positions of the handheld devices 108A-108C.

In some instances, the community game controller 104 can record a time at which events (e.g., button presses) are received from the handheld devices 108A-108C. The controller 104 can record the time, event (e.g., button press), and position of the handheld devices 108A-108C at the time of the event.

In some embodiments, the community game controller 104 can also record a time at which data is sent to the handheld devices 108A-108C. For example, the handheld devices 108A-108C can include programmable lighting. In response to certain events in the community game, the controller 104 activates lighting on the devices 108A-108C, and records one or more times at which it sent lighting signals to the devices. In another example, the handheld devices 108A-108C can include an internal mechanism to create a haptic feedback sensation (e.g., rumbling). In response to certain events in the community game, the internal mechanism in the handheld devices 108A-108C can be activated at certain levels and for a certain time interval. The community game controller 104 can record these events and times.

The processors in the wagering game machines 102A-102C transmit information to and receive information from the community game controller 104. In some embodiments, the community game controller 104 can receive a triggering signal associated with a community game that is achieved by at least one of the wagering gaming machines 102A-102C. Alternatively, the community game controller 104 can trigger the community game independent of the wagering game machines 102A-102C. The community game controller 104 transmits the triggering signal to the wagering gaming machines 102A-102C.

The community game can be triggered by a variety of outcomes including a special outcome achieved at one of the wagering gaming machines 102A-102C, a bonus outcome at one of the wagering gaming machines 102A-102C, etc. In some instances, the community game can be triggered when a certain amount of time has lapsed since the last community game, at fixed intervals, when a certain sum of wager inputs have been received at the wagering gaming machines 102A-102C, when a certain number of additional or maximum wagers are received at the wagering gaming machines 102A-102C, etc. The community game can be triggered so as to be awarded randomly as a "mystery bonus" to one or more players of the wagering gaming machines 102A-102C. In some cases, only certain players will be eligible to play the community game. Player eligibility to participate in the community game can be based on random player selection or on predetermined criteria, such as the amount or number of additional or maximum wagers at the player's gaming machine, rate of wagering over time at the player's gaming machine, the time since the player last made a wager at the player's gaming machine, the time since the player last played a community game, etc. Alternatively, all players playing at the wagering game machines 102A-102C can be eligible.

The community game on the community display 106 can include features for selecting objects or symbols displayed in the community game. For example, a community game can include a selection feature that allows players at the wagering gaming machines 102A-102C to select objects or symbols associated with awards or enhancements. In some embodiments, players at the wagering gaming machines 102A-102C can take turns selecting an object from a plurality of objects that are associated with the community game. The players can move their handheld devices 108A-108C to cause the cursor to on the community display 106 to be positioned over the object. The players can then use one of the buttons on the handheld devices 108A-108C to select the object. In this manner, a player's selection of an object can be affected by prior selections made by other players because prior selections can influence what selections are available and/or desirable to a subsequent player. This interaction, based on alternating or sequential player selections, provides for a more communal experience for the players as they root for other players to make selections that are favorable to their subsequent selections.

Each handheld device 108A-108C can have one or more buttons 120A or switches (only one button is shown on the handheld device 108A for clarity of illustration, but it should be understood that the other handheld device 108B-108C can share the same features as the handheld device 102A). The handheld device 108A includes an antenna 122A. An antenna 124A is disposed in the in the wagering game machines 102A-102C or in the community display 106 or at a location or locations within a sensing range of the handheld device 108A-108C. In this example, the antenna 122A includes three mutually orthogonal (e.g., oriented in the x, y, and z directions) sensing coils, and the antenna 124A includes a corresponding set of three mutually orthogonal transmitting coils. The sensing coils in the antenna 122A are configured to sense an electromagnetic field generated by the transmitting coils in the antenna 124A.

In this example, the transmitting coils in the antenna 124A are disposed in each of the wagering game machines 102A-102C. The transmitting coils are configured to generate an electromagnetic field that is transmitted along each of the mutually orthogonal coils at 90 degrees relative to each other. The sensing coils in the antenna 122A sense the electromagnetic energy, and based on the strength of the detected field, the relative orientation and position of the handheld device in three-dimensional space can be determined by a controller, such as a controller in the community game controller 104.

When a player holding the handheld device 108A desires to make a selection of a selectable element on the community display 106, the player points the handheld device 108A in the three-dimensional space in front of the wagering game machine 102A and stops at the target the player wishes to select. Optionally, a cursor, indicium or other game element can be displayed on the community display 106 to track the location of the handheld device 108A as the player waves it in front of the community display 106. To select the selectable element, the player depresses the switch or button 120A, which sends the selection information, along with the coordinate information representing the location and orientation of the handheld device 108A at the time that the button or switch 120A is depressed, to the community game controller 104 for determining an action to be performed as a result of the selection, such as awarding the player making the selection an award.

Instead of using electromagnetic radiation, infrared transmitters and receivers can be used to locate and orient the handheld devices 108A-108C in three-dimensional coordinate space. Likewise, instead of transmitters and receivers, a virtual track pad on a touch screen on each of the wagering game machines 102A-102C can be used by the player to move a cursor on the community display 106 and thereby make selections by touching the touch screen. Alternately, a track ball can be used by the players at the wagering game machines 102A-102C to move a cursor around on the community display 106 and to make selections by a button adjacent to the track ball.

FIG. 2 depicts a more detailed block diagram of a wagering game system that allows for recording of handheld device activity used in community games and for community game replay, according to some embodiments. FIG. 2 depicts a wagering game system 200 for community game play. The wagering game system 200 includes a display controller 202 that is communicatively coupled to community display devices 206A-206C. The display controller 202 is also communicatively coupled to a community game server 204 and an antenna 208. The antenna 208 is communicatively coupled to handheld devices 212A-212C.

The wagering game system 200 includes a bank of wagering game machines that include wagering game machines 210A-210C. The handheld device 212A is associated with the wagering game machines 210A. The handheld device 212B is associated with the wagering game machines 210B. The handheld device 212C is associated with the wagering game machines 210C. The handheld devices 212A-212C can be used by wagering game players for play of a community game that is being displayed (as described above).

During play of a community game, the community game server 204 provides game data for the community game to the display controller 202. The display controller 202 uses the game data to create video frames of the community game for display on the community displays 206A-206C. The display controller 202 also receives data from the antenna 208 and the handheld devices 210A-210C. This data represent activity (e.g., position and button presses) of the handheld devices 210A-210C that occurs during play of the community game. The display controller 202 integrates this data that represents the handheld device activity with the game data from the community game server 204 to create video frames that includes the handheld device activity for display of the community game on the community game display devices 206A-206C.

The display controller 202 also includes functionality to record the data that represent handheld device activity. As further described below, the display controller 202 can subsequently use this recorded data that represent handheld device activity to replay a community game that was previously displayed.

Figure 3:
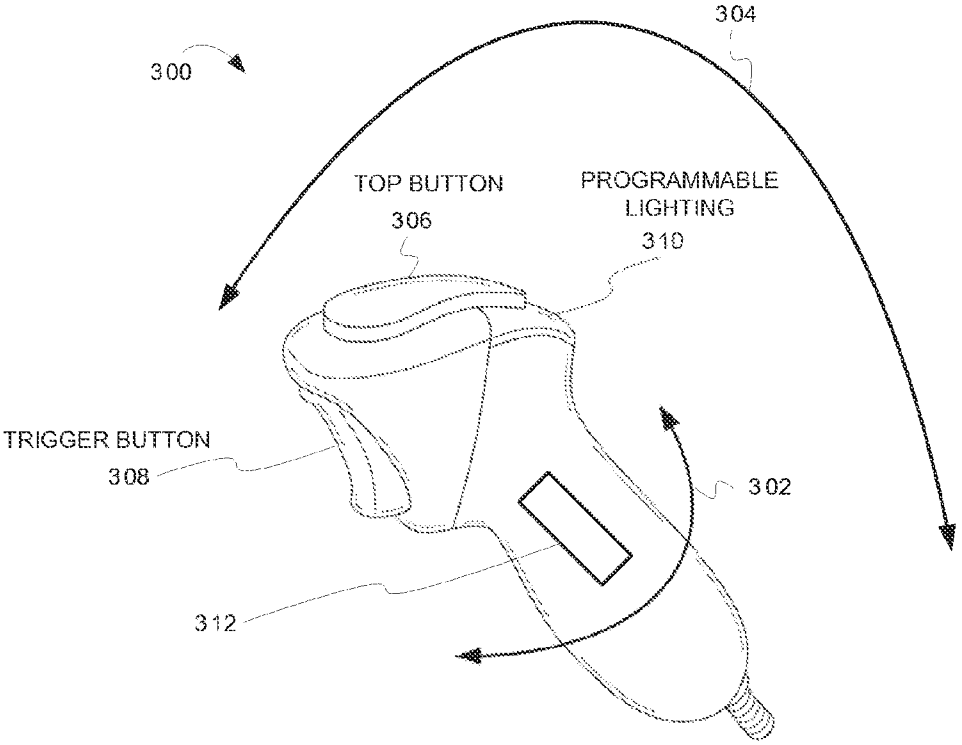
FIG. 3 depicts a handheld device, according to some embodiments.

FIG. 3 depicts a handheld device, according to some embodiments. FIG. 3 depicts a handheld device 300. Activity of the handheld device 300 can include movement of the handheld device and inputs (e.g., button presses) received from the handheld device as part of community game play. In some embodiments, the display controller 202 (shown in FIG. 2) can record different data that represents a position of the handheld device as part of the game history for a community game. Position of the handheld device 300 can include data indicating the device's orientation and location. The orientation indicates the device's movement 302 around a vertical axis and along a horizontal axis. In other words, orientation indicates which way the device is facing based on its movements (e.g., whether the device is upside down in space, on its side in space, etc.). The orientation can also indicate movement 304 around a horizontal axis and along a vertical axis of the handheld device 300. Position of the handheld device 300 can include a three-dimensional location—along X, Y, and Z axes. The position of the handheld device 300 can be recorded at periodic intervals. Accordingly, based on relative movement, tracking the current position over time allows for determining gestures as part of the community game play. Example gestures that can be tracked can include a throwing motion, a lassoing motion using a rope, etc.

The display controller 202 can record inputs from the handheld device 300 to the community game. In this example, the handheld device 300 includes a top button 306 and a trigger button 308. A player can use their thumb to press or select the top button 306 and can use their index finger to press or select the trigger button 308. The display controller 202 can record button presses of the top button 306 and the trigger button 308 as inputs to the community game. For example, a player can press the top button 306 to select an item being displayed on the community display device during community game play (as described above).

In some embodiments, the display controller 202 can also record outputs to the handheld device 300 that are provided during community game play. For example, outputs to the handheld device 300 that can be recorded include activating and deactivating lighting and haptic feedback sensation of vibration or rumbling.

In this example, the handheld device 300 includes programmable lighting 310. The display controller 202 (shown in FIG. 2) can transmit different instructions for different hues of light being emitted by the programmable lighting 310. To illustrate, the programmable lighting 310 can include multiple tri-colored light emitting diodes (LEDs). The multiple LEDs can be programmed independently with different colors or programmed together to produce a same color. The display controller 202 can also program the programmable lighting 310 to flash or remain lit for a defined period of time. For example, the display controller 202 can program the programmable 310 to flash for a defined period of time after a player wins a prize during community game play. The display controller 202 can record the activating and deactivating of the programmable lighting 310.

In some embodiments, the handheld device 300 includes an internal mechanism 312 to create a haptic feedback sensation of vibration or rumbling. The display controller 202 can transmit an instruction to activate and deactivate the mechanism 312. The display controller 202 can record the activating and deactivating of the internal mechanism 312 to create haptic feedback.

Games and Awards

The components described herein can facilitate various games and awards.

Referring back to FIG. 1, the community display 106 can be utilized to depict a skill-based community game thereon. The skill-based community game includes at least one skill component that provides an actual or apparent advantage to a player as their proficiency at the skill-based community game increases. As discussed above, the skill-based community game can be a community game in which a plurality of selectable targets are presented for selection by a player of the skill-based community game. In some embodiments, the skill-based community game takes the form of a shooting game where the player may be required to display a particular level of proficiency at aiming so as to select their desired target. For example, the players may be required to point their respective handheld devices 108A-108C in the direction of a particular target and depress the respective buttons 120A to "shoot" at the intended target. Players who have properly "aimed" their handheld device 108A-108C when the "trigger" (e.g., button 120A) is depressed are awarded the selection, whereas players who have incorrectly aimed their handheld devices 108A-108C may not be awarded the particular selections.

In the above-described skill-based community game, players may be given multiple chances to hit one or more targets. Although players have multiple opportunities to hit targets, some players may be less proficient at doing so than others. However, in a skill-based wagering game, the operator may want to limit the amount of expected-value variation among players. In other words, the operator may want to ensure that a highly skilled player receives the same overall payout as a player with no skill at all. In some embodiments, the skill-based wagering game is designed to alter the mathematical outcomes such that players of high skill and of low skill have substantially identical expected values for the skill-based wagering game.

In some embodiments, the skill-based wagering game utilizes a physics-based world within game. When players miss targets within the physics-based world, the bullets may bounce off other objects in the environment. These bounces and ricochets can be used to balance out the mathematics of the game by tracking the number of targets hit and missed as the bonus progresses and by manipulating the physics accordingly. For example, if a player has been consistently missing targets, the game can begin to force "lucky bounces" where a bullet ricochets off an object in the environment and hits the intended target, a different target, or a mystery area. By "handicapping" the skill-based wagering game in this manner, the player feels they got lucky instead of getting a "pity" award at the end of the bonus. The worse a player is, based on the tracking of targets missed, the luckier the player appears to be as their misses begin to strike targets within the physics-based world.

In some embodiments, the physics-based world may include random "multi-selection" targets and "self-destructing" targets. These targets, when hit, or ricocheted into, by a less skilled player may explode to award multiple targets in proximity to the original target, or they may even simply randomly self-destruct without being hit by a player. In a skill-based community game, for example, as the players progress through the skill-based bonus rounds, some "player-specific" targets may be provided on the community display 106. These player-specific targets may only be selected by (e.g., shot), and awarded to, a particular player. The award values of these player-specific targets may appear to be random to the players, but are, in fact, adjusted based on the players' proficiency up through that point of the skill-based community game. Thus, the less proficient a particular player has been up to that point of the skill-based community game, the more likely that player is to receive a higher value for their associated player-specific target. Alternatively, the less proficient players can be given various advantages over the remainder of the skill-based wagering game, such as a higher quantity of targets, larger targets, exploding bullets, a different type of weapon with a larger blast radius (e.g., pistol, to sniper, to shotgun, to rocket launcher as continued lack of skill is demonstrated).

In some embodiments, the skill-based wagering game may be separated into two unique components, an interactive skill-based component and a non-skill-based component (e.g., a free-spin component). The skill-based component may have a small effect or no effect on a player's payback percentage, whereas the non-skill-based component creates the true mathematical variety, volatility, and near-miss experience that are desirable for a wagering game. For example, the skill-based component may be a shooting game as described above, including a plurality of shootable targets. For each target a player shoots, the player is awarded a free spin in a subsequent, non-skill-based component. Thus, the more skillful a player, the more free spins they are awarded in the subsequent event.

The non-skill-based component, however, may be adjusted to compensate players displaying lesser proficiency at the skill-based component. In one embodiment, if a player misses every target in the skill-based game (or decides not to participate at all in the skill-based component), they may be provided two free spins. Alternatively, a player that went ten for ten in the skill-based component may be provided twelve free spins. So as to ensure that the non-skillful player has the same payback percentage as the skilled player, the mathematical model for the two free spins is altered to be different from the mathematical model of the twelve free spins. For example, if the average payout for each of the twelve free spins is 1×, the average payout for each of the two free spins could be adjusted to be 6×. Thus, the overall average payout for both the skilled and unskilled player is 12×, but the volatility and game experience for each player is dramatically different.

In some embodiments, awards can be based on the number of targets collected by a player, and can be bonus free spin events, more free spins, a mystery prize, a number of credits, a bonus event, and the like, which can be redeemed on the individual wagering game being played by the participating player on the wagering game machines 102A-102C. The award types can be adapted to the skill of the participating player to discourage unskilled players from becoming frustrated and ceasing their participation in the community game. For example, if an unskilled participating player in a particular session of the community game is missing many of the targets, the community display 106 can be adapted to display in front of the unskilled player an easy target that has a large selectable area. If this unskilled player is using the center wagering game machine 102B, the large target can be positioned in the center of the community display 106 to make it easier for the unskilled player to hit the target. In some embodiments, the adjusted mathematical models used for these adjustments during the bonus round for the unskilled player can also be recorded for subsequent replays.

Operating Environment

This section describes example operating environments of some embodiments. More specifically, this section includes discussion about example wagering game system architectures.

FIG. 4 depicts a more detailed block diagram of a display controller and a community game server for recordation of handheld device activity occurring during a community game, according to some embodiments. FIG. 4 depicts a display controller 402, a community game server 404 and handheld devices 420A-420C. The display controller 402, the community game server 404, and the handheld devices 420A-420C are examples of the display controller 202, the community game server 204, and the handheld devices 212A-212C of FIG. 2, respectively. FIG. 4 shows communications during play of a live community game to record handheld device activity. The display controller 402 is communicatively coupled to the handheld devices 420A-420C and is also communicatively coupled to the community game server 404.

The display controller 402 includes a community game presentation unit 406, a handheld device input service 408, and a game history recorder unit 410. The community game presentation unit 406, the handheld device input service 408, and the game history recorder unit 410 can be hardware, software, firmware or a combination thereof. For example, the community game presentation unit 406, the handheld device input service 408, and the game history recorder unit 410 can be software executing on one or more processors (not shown) in the display controller 402. The community game server 404 includes a community game unit 412 and non-volatile machine-readable media 414. The community game unit 412 can also be hardware, software, firmware or a combination thereof. For example, the community game unit 412 can be software executing on one or more processors (not shown) in the community game server 404. During play of a live community game, components of the display controller 402, the community game server 404 and the handheld devices 420A-420C perform operations to enable recording of handheld device activity to enable subsequent replay of the community game.

Initially, during live play of the community game, the community game unit 412 in the community game server 404 can create game data that is used in creating the video frames of the community game for display on one or more community display devices. The community game unit 412 transmits the game data to the community game presentation unit 406 (game data for video frame rendering for community game 426). Using the game data, the community game presentation unit 406 can create the video frames for display on the community display devices.

Also during play of the live community game, activity by the handheld devices 420A-420C can affect the community game play (including the video being displayed). To illustrate, the handheld devices 420A-420C transmit communications (live handheld device input activity 421) to the handheld device input service 408. In some embodiments, in order to receive the messages, the handheld device input service 408 can poll the handheld devices 420A-420C periodically. For example, the handheld device input service 408 can poll the handheld devices 420A-420C eight times per second, four times per second, 16 times per second, etc. Alternatively or in addition to polling, the handheld devices 420A-420C can periodically push data defining live handheld device input activity to the handheld device input service 408. As described above, the live handheld device input activity can include current position (e.g., location and orientation in three-dimensional space) of the handheld devices 420A-420C and inputs (e.g., button presses) from the handheld devices 420A-420C. If the inputs are received between the polling intervals, the handheld devices 420A-420C can store the input for transmission at a next polling interval.

The live handheld device input activity 421 can include the position of the handheld devices (recorded at periodic intervals) and inputs (e.g., button presses) from the handheld devices 420A-420C. The game history recorder unit 410 can capture the live handheld device activity 421 that are inputs from the handheld devices 420A-420C being received by the handheld device input service 408. The game history recorder unit 410 can store the live handheld device activity 421 as part of the game history for the community game. The game history recorder unit 410 can store the live handheld device activity 421 relative to a timeline of the community game. In other words, along with the live handheld device activity 421 the game history recorder unit 410 can store the time point in the community game when this activity occurred.

The handheld device input service 408 can also transmit communications back to the handheld devices 420A-420C (live handheld device output activity 423). These communications can include instructions to cause output activity (lighting, vibration, rumble, etc.) at the handheld devices 420A-420C. For example during community game play, the community game unit 412 can transmit communications to the handheld device input service 408 that instruct the handheld device input service 408 to output instructions to one or more of the handheld devices 420A-420C. These instructions can cause output activity at the one or more of the handheld devices 420A-420C. The handheld device input service 408 can also output subsequent messages to the one or more of the handheld devices 420A-420C to cause the output activity to be deactivated.

In some embodiments, the game history recorder unit 410 can capture the live handheld device output activity 423 that are outputs to the handheld devices 420A-420C from the handheld device input service 408. The game history recorder unit 410 can store the live handheld device output activity 423 as part of the game history for the community game. The game history recorder unit 410 can store the live handheld device output activity 423 relative to the timeline of the community game (as described above).

The game history recorder unit 410 can store the live handheld device input activity 421 in the non-volatile machine-readable media 414 in the community game server 404 (recorded live handheld device activity 424). If the live handheld device output activity 423 is also being captured as part of the game history, the game history recorder unit 410 can also store the live handheld device output activity 423 in the non-volatile machine-readable media 414 in the community game server 404.

The game history recorder unit 410 can store the activity in the non-volatile machine-readable media 414 as the data is received from the handheld devices 420A-420C. Alternatively, the game history recorder unit 410 can perform a block transfer of data representing multiple activities. For example, the game history recorder unit 410 can compress and perform a block transfer to the non-volatile machine-readable media 414 of the different activity in a community game, after a community game is complete. In some embodiments, the game history recorder unit 410 can store the recorded live handheld device activity 424 in other locations than the non-volatile machine-readable storage media 414. For example, the game history recorder unit 410 can store the recorded live handheld device activity 424 in local media (not shown) in the display controller 402, remote servers, etc.

During play of the live community game, the community game presentation unit 406 receives live handheld device activity 422 from the handheld device input service 408. The live handheld device activity 422 can include current position of the handheld devices 420A-420C and inputs (e.g., button presses) from the handheld devices 420A-420C to the community game. The current position of the handheld devices 420A-420C can be represented by game elements (e.g., cursors) on the display of the community game. Also, inputs from the handheld devices 420A-420C can trigger game events that are displayed as part of the community game. For example, a button press of a handheld device when the associated cursor is positioned over a box can cause the box to open to reveal a reward.

As described above, the community game presentation unit 406 creates a video frame based on game data received from the community game unit 412. Prior to displaying the video frame, the community game presentation unit 406 can update the video frame to include the live handheld device activity 422. For example, the community game presentation unit 406 can update the video frame to show the position of the cursors (or other game elements) associated with the handheld devices 420A-420C. The community game presentation unit 406 can also update the video frame based on any inputs from the handheld devices 420A-420C. For example, the community game presentation unit 406 can update the video frame to change a box from unopened to opened to reveal a reward based on a button press. After updates to the video frame, the community game presentation unit 406 outputs the video frame for display on the community display devices (shown as video of live community game with live handheld device activity 428).

These operations of FIG. 4 continue until the community game is complete.

This discussion continues with operations for replaying games based on data indicating activities of handheld devices. Operators may want to replay games to settle player disputes, promote games by showing previous big wins, etc. FIG. 5 depicts the block diagram of FIG. 4 during replay of a community, according to some embodiments. FIG. 5 also depicts communications by components of the display controller 402, components of the community game server 404, and the handheld devices 420A-420C during replay of a community game.

Initially during replay of the community game, the community game unit 412 in the community game server 404 can create game data that is used in creating the video frames of the video of the community game for display on the community display devices. The community game unit 412 transmits the game data to the community game presentation unit 406 (shown as game data for creating video frames for community game 526). Using the game data, the community game presentation unit 406 creates the video frames for display on the community display devices. Accordingly, the community game presentation unit 406 does not use recorded video to replay games. Video of the live community game is not recorded. Rather, the community game presentation unit 406 recreates the video based on the game data (similar to operations that occur during display of the live community game).

After initiating the replay, the handheld device input service 408 receives, from the community game server 404, recorded handheld device activity of the community game being replayed (recorded handheld device activity 520). For example, the handheld device input service 408 can retrieve the recorded handheld device activity from the non-volatile machine-readable media 414. As described above, the recorded handheld device activity can include current positions (e.g., orientation, rotation, and three-dimensional position) of the handheld devices 420A-420C at periodic intervals, and inputs (e.g., button presses) from the handheld devices 420A-420C. Therefore, the community game presentation unit 406 receives the recorded handheld device activity 520 in place of live handheld device activity.

As described above, the community game presentation unit 406 creates a video frame based on game data received from the community game unit 412. Prior to displaying the video frame, the community game presentation unit 406 can update the video frame to include the recorded handheld device activity 520. For example, the community game presentation unit 406 can update the video frame to show the position of the cursors associated with the handheld devices 420A-420C. The community game presentation unit 406 can also update the video frame based on any inputs from the handheld devices 420A-420C. After updates to the video frame based on the recorded handheld device activity 520, the community game presentation unit 406 outputs the video frame for display on the community display devices (shown as video of community game with recorded handheld device activity 528).

In some embodiments, the recorded handheld device activity can also include output to the handheld devices 420A-420C (handheld device output activity 550). The handheld device input service 408 can use these recorded outputs to recreate the output instructions for recreating output at the handheld devices 420A-420C. Alternatively, the handheld device input service 408 can recreate the output instructions based on game data from the community game unit 412 (similar to creating the output instructions during play of the live community game). The handheld device input service 408 can then transmit the output instructions to the handheld devices 420A-420C to cause the output at the handheld devices 420A-420C.

These operations of FIG. 5 continue until replay of the community game is complete.

In some embodiments, the handheld devices can also be used to play the base game at the wagering game machines. For example, a player can press a button on the handheld device to trigger a new wagering game (e.g., initiate spinning of the reels for a slots game). In some embodiments, the recording of handheld device activity is not performed during play of the base game. Accordingly, some embodiments include selective recording of handheld device activity based on whether the base game or the community game is being played.

Also, while described in reference to play of a community game at a bank of wagering game machines, some embodiments can be used for recording of handheld device activity in other games or activities for wagering where recording movement of handheld devices at periodic intervals is needed for subsequent replay.

As described in some embodiments, some but not all of the components in the display controller 402 and the community game server 404 can be configured to operate differently depending on whether the community game is live or a replay. For example, the community game presentation unit 406 and the community game unit 412 can be configured to operate essentially the same for a live community game and a community game replay. In particular, the community game presentation unit 406 can receive the same game data from the community game unit 412 for a community game regardless of whether the community game is live or a replay. Also, the community game presentation unit 406 can receive handheld device activity from the handheld input service 408 without knowledge of whether the handheld device activity is from live play or from a recorded history of a previous community game play.

In contrast, the handheld input service 408 and the game history recorder unit 410 can be configured to operate differently depending on whether the community game is live or a replay. For live play, the handheld input service 408 can provide live handheld device activity from the handheld devices to the community game presentation unit 406. For a replay, the handheld input service 408 can provide recorded handheld device activity from a prior community game play to the community game presentation unit 406. The game history recorder unit 410 can be configured to only record for live play (not for a replay).

Also in some embodiments, live community game play and a replay are not mutually exclusive. For example, the handheld input service 408 can provide both live and recorded handheld device activity to the community game presentation unit 408. As an example, if there is only one wagering game player playing a wagering game machine at the bank of wagering game machines, a community game can still occur. As part of live play of the community game, the handheld input service 408 can provide live handheld device activity from the one wagering game player and can provide recorded handheld device activity from a replay that includes past activity from one or more additional wagering game players.

Example Operations

This section describes operations associated with some embodiments. In the discussion below, the flowcharts will be described with reference to the block diagrams presented above. However, in some embodiments, the operations can be performed by logic not described in the block diagrams.

In certain embodiments, the operations can be performed by executing instructions residing on machine-readable media (e.g., software), while in other embodiments, the operations can be performed by hardware and/or other logic (e.g., firmware). In some embodiments, the operations can be performed in series, while in other embodiments, one or more of the operations can be performed in parallel. Moreover, some embodiments can perform less than all the operations shown in the flowcharts. The section will discuss FIGS. 6-7.

Figure 6:
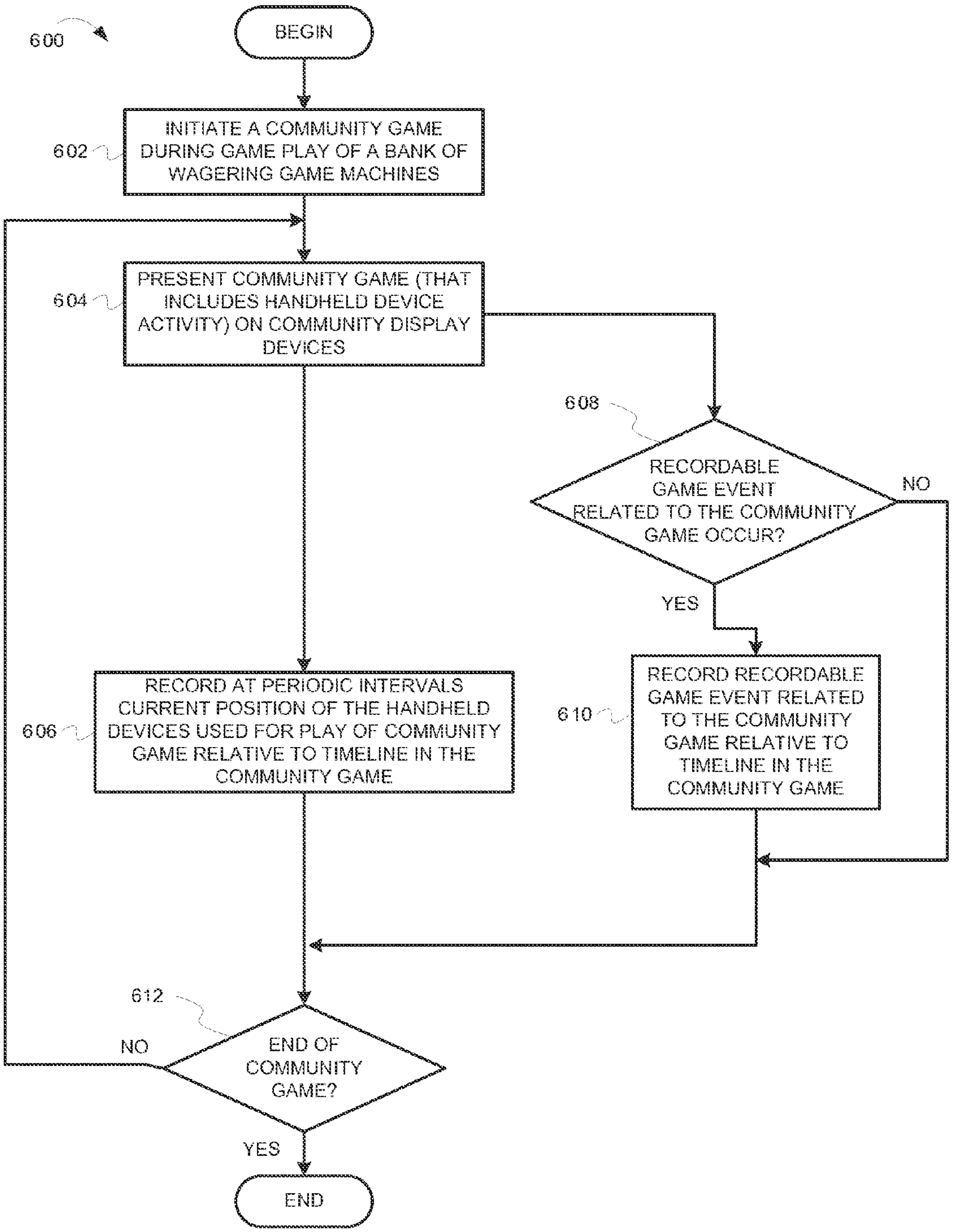
FIG. 6 depicts a flowchart for recording game history of handheld device activity used in community games, according to some embodiments.
Figure 7:
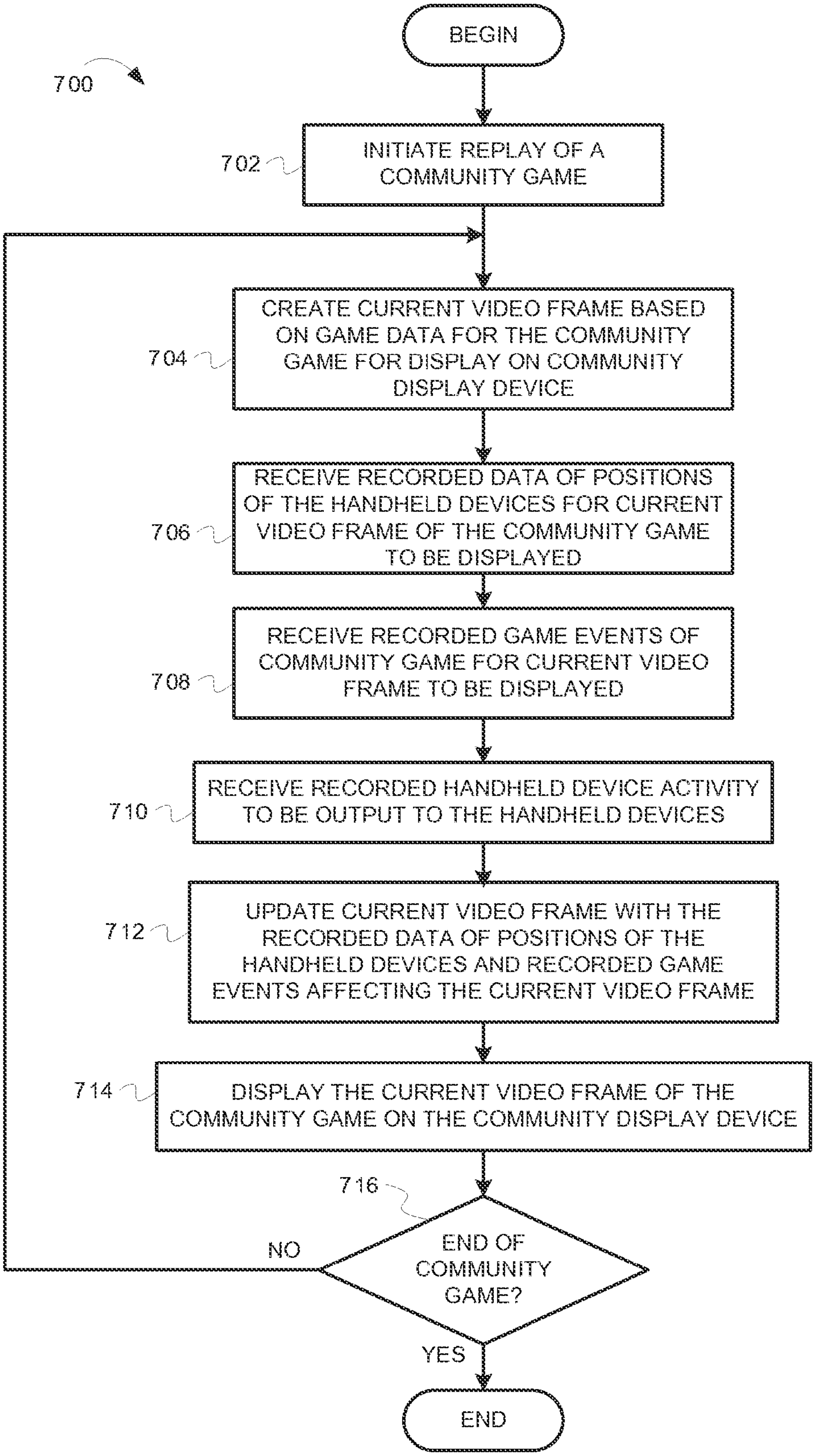
FIG. 7 depicts a flowchart for replay of a community game based on game history of handheld device activity used in the community games, according to some embodiments.

FIG. 6 describe how game history of a live community game is recorded, where the game history includes handheld device activity. FIG. 7 describes how a community game that includes handheld device activity is replayed.

FIG. 6 depicts a flowchart for recording game history of handheld device activity used in community games, according to some embodiments. A flowchart 600 will be described in reference to the example architecture of FIG. 4. The flowchart 600 begins at block 602.

At block 602, the community game unit 414 in the community game server 412 initiates a community game during game play of a bank of wagering game machines. As described above, a community game can be triggered by a variety of outcomes including a special outcome achieved at one of the wagering gaming machines, a bonus outcome at one of the wagering gaming machines, etc. The community game can also be triggered when a certain amount of time has lapsed since the last community game, at fixed intervals, when a certain sum of wager inputs have been received at the wagering gaming machines, when a certain number of additional or maximum wagers are received at the wagering gaming machines, etc. The community game can also be triggered randomly as a “mystery bonus” for one or more players of the wagering gaming machines. In response to triggering the community game, the community game unit 414 initiates the community game. Operations of the flowchart 600 continue at block 604.

At block 604, the community game presentation unit 406 presents a community game on the community display devices. The community game unit 412 transmits the game data to the community game presentation unit 406. Using the game data, the community game presentation unit 406 can create the video frames for display on the community display devices. Also prior to displaying the video frames, the community game presentation unit 406 can update the video frames to include the live handheld device activity 422. For example, the community game presentation unit 406 can update the video frames to show the position of the cursors associated with the handheld devices 420A-420C. The community game presentation unit 406 can also update the video frames based on any inputs from the handheld devices 420A-420C. Operations of the flowchart 600 continue at blocks 606 and 608.

At block 606, the game history recorder unit 410 records at periodic intervals current position of the handheld devices used for play of community game relative to a timeline in the community game. For example, the handheld device input service 408 can poll the handheld devices 420A-420C periodically. The game history recorder unit 410 can capture the current positions of the handheld devices at periodic intervals that are inputs from the handheld devices 420A-420C being received by the handheld device input service 408. The game history recorder unit 410 can store these positions as part of the game history for the community game. The game history recorder unit 410 can store these positions device activity 421 relative to a timeline of the community game. In other words, the game history recorder unit 410 can store the time point in the community game when current positions of the handheld devices are recorded. Operations of the flowchart 600 continue at block 612 (which is described in more detail below).

The operations at block 606 can occur simultaneously with the operations at blocks 608 and 610.

At block 608, the game history recorder unit 410 determines whether a recordable game event related to the community game occurred. Game events can include inputs (e.g., button presses) from the handheld devices 420A-420C and outputs (e.g., lighting, vibration, rumble, etc.) to the handheld devices 420A-420C. The game events can also include activity independent of the handheld devices 420A-420C. For example, recordable game events can include events that are determined by a randomized determination for awarding a prize or a physics determination for movement of an object in the community game. To illustrate, a physics engine can determine a result of a ball being pushed off a table during the community game. These game events can be recorded to ensure a more accurate replay of the community game. The community game unit 412 can provide these types of recordable game events to the game history recorder unit 410.

The game history recorder unit 410 can receive the game events (e.g., button presses) from the handheld devices 420A-420C being received by the handheld device input service 408. The game history recorder unit 410 can also receive game events that are outputs being transmitted by the handheld device input service 408 to the handheld devices 420A-420C. The game history recorder unit 410 can also receive game events (e.g., awarding of a prize) from the community game unit 412. One or more of these game events can be considerable a recordable event. Therefore, the game history recorder unit 410 can record one or more of these game events. For example, the game history recorder unit 410 can record only the inputs from the handheld devices 420A-420C or all game events related to the community game. If a recordable game event related to the community game did occur, operations of the flowchart 600 continue at block 610. Otherwise, operations of the flowchart 600 continue at block 612.

At block 610, the game history recorder unit 410 records the recordable game event related to the community game relative to the timeline of the community game. The game history recorder unit 410 can record the recordable game events in the non-volatile machine-readable media 414 in the community game server 404. The game history recorder unit 410 can store these recordable events relative to a timeline of the community game. In other words, the game history recorder unit 410 can store the time point in the community game when the recordable event occurred. Operations of the flowchart 600 continue at block 612.

At block 612, the community game presentation unit 406 determines whether the end of the community game has been reached. If the community game has not been reached, operations of the flowchart 600 continue back at block 604. Otherwise, operations of the flowchart 600 are complete.

Operations for replaying a community game are now described. In particular, FIG. 7 depicts a flowchart for replay of a community game based on game history of handheld device activity used in the community games, according to some embodiments. A flowchart 700 will be described in reference to the example architecture of FIG. 5. The flowchart 700 begins at block 702.

At block 702, the community game unit 412 initiates replay of a community game. With reference to FIG. 5, the community game unit 414 in the community game server 412 initiates replay of a community game. For example, a casino operator can instruct the community game unit 412 to initiate the replay for a dispute resolution of results of the community game. In another example, the community game unit 414 could initiate replay when there is no wagering occurring at the bank of wagering game machines as part of an attract mode to attract players to play the wagering game machines. For example, the community game unit 414 can initiate replay of a community game after the bank of wagering game machines have been idle for a defined time period (e.g., 10 minutes, 15 minutes, etc.). Operations of the flowchart 700 continue at block 704.

At block 704, the community game presentation unit 406 creates a current video frame based on game data for the community game for display on community display device. The community game unit 412 transmits the game data to the community game presentation unit 406. Using the game data, the community game presentation unit 406 creates a current video frame for display on the community display devices. Accordingly, the community game presentation unit 406 does not use recorded video of the community game to be replayed. Video of the live community game is not recorded. Rather, the community game presentation unit 406 recreates the video based on the game data (similar to operations that occur during display of the live community game). Operations of the flowchart 700 continue at block 706.

At block 706, the community game presentation unit 406 receives recorded data of positions of the handheld devices for current video frame of the community game to be displayed. In response to initiation of replay of a community game, the handheld device input service 408 can receive, from the community game server 404, recorded handheld device activity from the previous community game to be replayed. As described above, the recorded handheld device activity can include current positions (e.g., orientation, rotation, and three-dimensional position) of the handheld devices 420A-420C at periodic intervals and inputs (e.g., button presses) from the handheld devices 420A-420C. The recorded positions of the handheld devices can be positions that are recorded at periodic intervals along a timeline of the community game. The handheld device input service 408 can transmit to the community game presentation unit the recorded positions that can affect the current video frame. Operations of the flowchart 700 continue at block 708.

At block 708, the community game presentation unit 406 receives recorded game events of community game for current video frame to be displayed. The recorded events (e.g., button presses) of the community game can be included in the recorded handheld device activity received by the handheld device input service 408. The recordable game events can also include activity independent of the handheld devices 420A-420C. For example as described above, recordable game events can include events that are determined by a randomized determination for awarding a prize or a physics determination for movement of an object in the community game. The handheld device input service 408 can transmit to the community game presentation unit 406 the recorded game events of the community game that can affect the current video frame. Operations of the flowchart 700 continue at block 710.

At block 710, the handheld device input service 408 receives the recorded handheld device activity to be output to the handheld devices 420A-420C. In some embodiments, the recorded handheld device activity can also include output to the handheld devices 420A-420C (handheld device output activity 550). The handheld device input service 408 can use these recorded outputs to recreate the output instructions for recreating output at the handheld devices 420A-420C. Alternatively, the handheld device input service 408 can recreate the output instructions based on game data from the community game unit 412 (similar to creating the output instructions during play of the live community game). The handheld device input service 408 can then transmit the output instructions to the handheld devices 420A-420C to cause the output at the handheld devices 420A-420C. Operations of the flowchart 700 continue at block 712.

At block 712, the community game presentation unit 406 updates the current video frame with the recorded data of positions of the handheld devices and recorded game events affecting the current video frame. Prior to displaying the video frame, the community game presentation unit 406 can update the video frame to include the recorded data of positions of the handheld devices and recorded game events. For example, the community game presentation unit 406 can update the video frame to show the position of the cursors associated with the handheld devices 420A-420C. The community game presentation unit 406 can also update the video frame based on any inputs from the handheld devices 420A-420C or other recorded game events. Operations of the flowchart 700 continue at block 714.

At block 714, the community game presentation unit 406 displays the current video frame of the community game on the community display device. After updates to the video frame, the community game presentation unit 406 outputs the video frame for display on the community display devices. Operations of the flowchart 700 continue at block 716.

At block 716, the community game presentation unit 406 determines whether the end of the community game has been reached. If the community game has not been reached, operations of the flowchart 700 continue back at block 704. Otherwise, operations of the flowchart 700 are complete.

Wagering Game Machine Architecture

This section describes an example wagering game architecture of some embodiments. FIG. 8 depicts a block diagram illustrating a wagering game machine architecture, according to some embodiments. In particular, FIG. 8 depicts an architecture of one of the wagering game machine 102A-102C of FIG. 1. A wagering game machine 810 includes a central processing unit (CPU) 830 connected to a main memory 828. The CPU 830 may include any suitable processor(s), such as those made by Intel and AMD. By way of example, the CPU 830 includes a plurality of microprocessors including a master processor, a slave processor, and a secondary or parallel processor. CPU 830, as used herein, comprises any combination of hardware, software, or firmware disposed in or outside of the wagering game machine 810 that is configured to communicate with or control the transfer of data between the wagering game machine 810 and a bus, another computer, processor, device, service, or network. The CPU 830 comprises one or more controllers or processors and such one or more controllers or processors need not be disposed proximal to one another and may be located in different devices or in different locations. The CPU 830 is operable to execute all of the various gaming methods and other processes disclosed herein. The main memory 828 includes wagering game module 832. In one embodiment, the wagering game module 832 832 may present wagering games, such as video poker, video black jack, video slots, video lottery, etc., in whole or part.

The CPU 830 is also connected to an input/output (I/O) bus 836, which can include any suitable bus technologies, such as an AGTL+ frontside bus and a PCI backside bus. The I/O bus 836 is connected to various input devices 838, output devices 840, and input/output devices 842 such as those discussed below in connection with FIG. 9. The I/O bus 836 is also connected to a storage unit 844 and an external system interface 846, which is connected to external system(s) 848 (e.g., wagering game networks).

The external system 848 includes, in various aspects, a gaming network, other gaming machines, a gaming server, a remote controller, communications hardware, or a variety of other interfaced systems or components, in any combination. In yet other aspects, the external system 848 may comprise a player's portable electronic device (e.g., cellular phone, electronic wallet, etc.) and the external system interface 846 is configured to facilitate wireless communication and data transfer between the portable electronic device and the CPU 830, such as by a near-field communication path operating via magnetic-field induction or a frequency-hopping spread spectrum RF signals (e.g., Bluetooth, etc.).

The wagering game machine optionally communicates with the external system 848 such that the wagering game machine operates as a thin, thick, or intermediate client. In general, a wagering game includes an RNG for generating a random number, game logic for determining the outcome based on the randomly generated number, and game assets (e.g., art, sound, etc.) for presenting the determined outcome to a player in an audio-visual manner. The RNG, game logic, and game assets are contained within the wagering game machine 810 ("thick client" wagering game machine), the external system 848 ("thin client" wagering game machine), or are distributed therebetween in any suitable manner ("intermediate client" wagering game machine).

Figure 9:
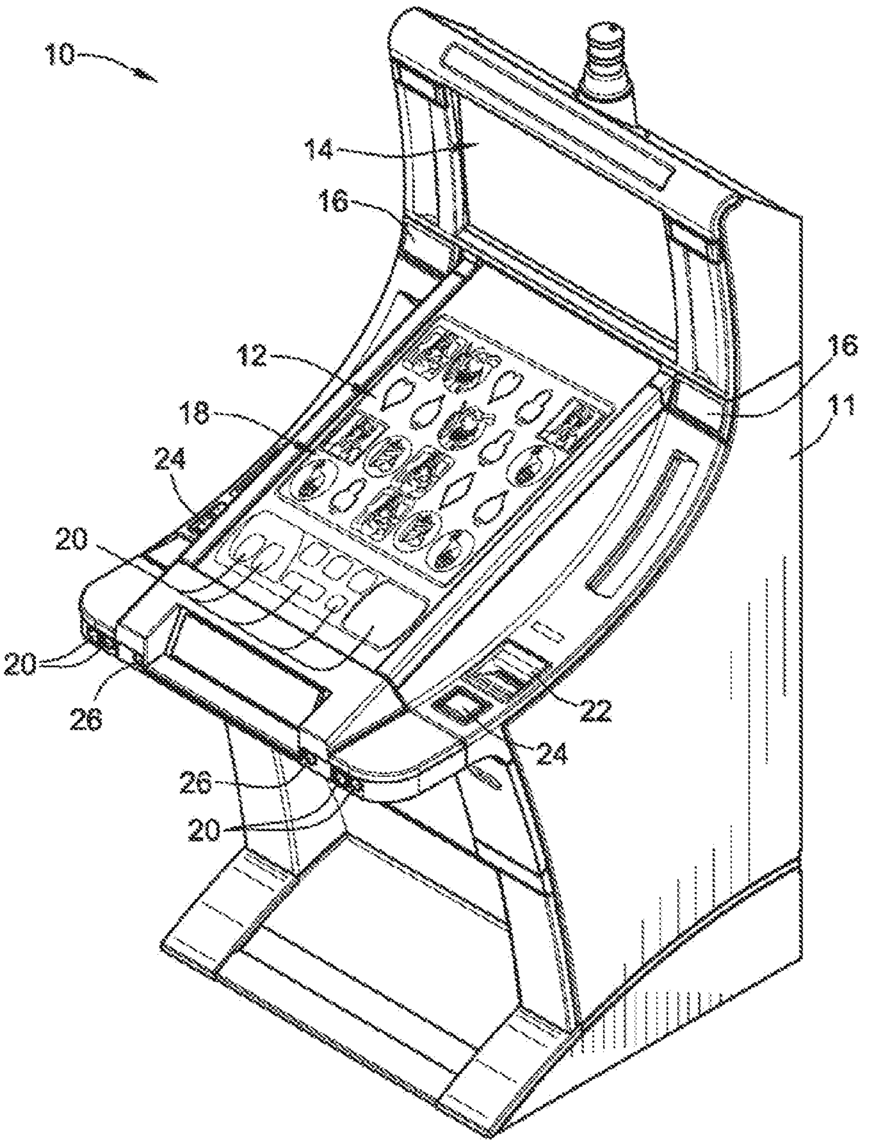
FIG. 9 depicts a perspective view of a wagering game machine, according to some example embodiments.

The wagering game machine 810 may include additional peripheral devices or more than one of each component shown in FIG. 9. Any component of the wagering game machine architecture may include hardware, firmware, or tangible machine-readable storage media including instructions for performing the operations described herein. Machine-readable storage media includes any mechanism that stores information and provides the information in a form readable by a machine (e.g., wagering game machine, computer, etc.). For example, machine-readable storage media includes read only memory (ROM), random access memory (RAM), magnetic disk storage media, optical storage media, flash memory, etc.

Example Wagering Game Machine

FIG. 9 depicts a perspective view of a wagering game machine, according to some embodiments. Referring to FIG.

9, there is shown a wagering game machine 10 similar to those used in gaming establishments, such as casinos. The wagering game machine 10 may be any type of gaming machine and may have varying structures and methods of operation. For example, in some aspects, the wagering game machine 10 is an electromechanical gaming machine configured to play mechanical slots, whereas in other aspects, the gaming machine is an electronic gaming machine configured to play a video casino game, such as slots, keno, poker, blackjack, roulette, craps, etc. The wagering game machine 10 may take any suitable form, such as floor-standing models as shown, handheld mobile units, bartop models, workstation-type console models, etc. Further, the wagering game machine 10 may be primarily dedicated for use in conducting wagering games, or may include non-dedicated devices, such as mobile phones, personal digital assistants, personal computers, etc. Exemplary types of wagering game machines are disclosed in U.S. Pat. No. 6,517,433 and Patent Application Publication Nos. US2010/0062196 and US2010/0234099, which are incorporated herein by reference in their entireties.

The wagering game machine 10 illustrated in FIG. 9 comprises a cabinet 11 that may house various input devices, output devices, and input/output devices. By way of example, the wagering game machine 10 includes a primary display area 12, a secondary display area 14, and one or more audio speakers 16. The primary display area 12 or the secondary display area 14 may be a mechanical-reel display, a video display, or a combination thereof in which a transmissive video display is disposed in front of the mechanical-reel display to portray a video image superimposed upon the mechanical-reel display. The display areas may variously display information associated with wagering games, non-wagering games, community games, progressives, advertisements, services, premium entertainment, text messaging, emails, alerts, announcements, broadcast information, subscription information, etc. appropriate to the particular mode (s) of operation of the wagering game machine 10. The wagering game machine 10 includes a touch screen(s) 18 mounted over the primary or secondary areas, buttons 20 on a button panel, bill validator 22, information reader/writer(s) 24, and player-accessible port(s) 26 (e.g., audio output jack for headphones, video headset jack, USB port, wireless transmitter/receiver, etc.). It should be understood that numerous other peripheral devices and other elements exist and are readily utilizable in any number of combinations to create various forms of a gaming machine in accord with the present concepts.

Input devices, such as the touch screen 18, buttons 20, a mouse, a joystick, a gesture-sensing device, a voice-recognition device, and a virtual input device, accept player input(s) and transform the player input(s) to electronic data signals indicative of the player input(s), which correspond to an enabled feature for such input(s) at a time of activation (e.g., pressing a “Max Bet” button or soft key to indicate a player’s desire to place a maximum wager to play the wagering game). The input(s), once transformed into electronic data signals, are output to a CPU for processing. The electronic data signals are selected from a group consisting essentially of an electrical current, an electrical voltage, an electrical charge, an optical signal, an optical element, a magnetic signal, and a magnetic element.

Figure 10:
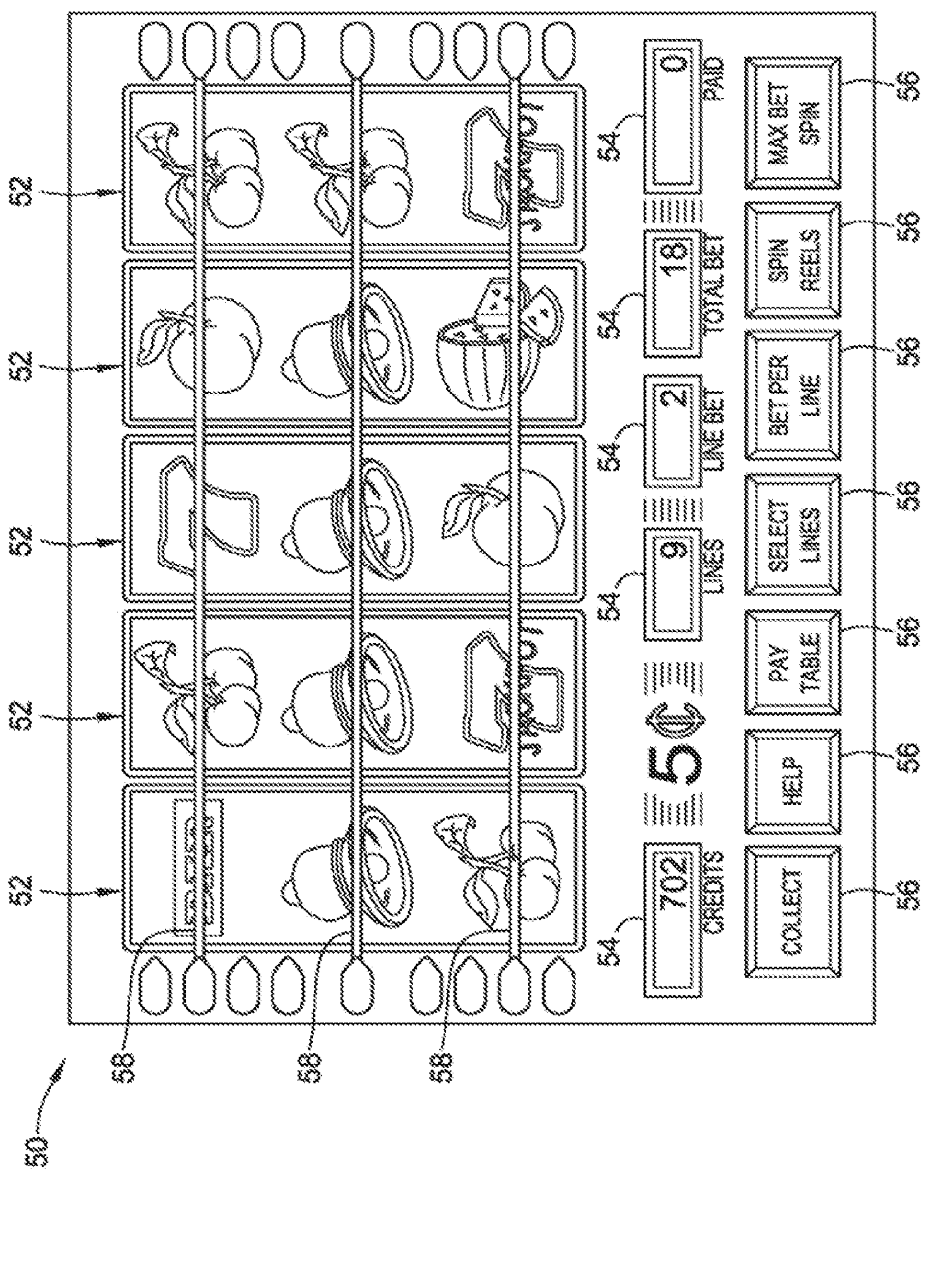
FIG. 10 depicts an image of a base-game screen for a wagering game machine, according to some example embodiments.

FIG. 10 depicts an image of a base-game screen for a wagering game machine, according to some embodiments. Referring to FIG. 10, there is illustrated an image of a basic-game screen 50 adapted to be displayed on the primary display area 12 or the secondary display area 14 (shown in FIG. 9). The basic-game screen 50 portrays a plurality of simulated symbol-bearing reels 52. Alternatively or additionally, the basic-game screen 50 portrays a plurality of mechanical reels or other video or mechanical presentation consistent with the game format and theme. The basic-game screen 50 also advantageously displays one or more game-session credit meters 54 and various touch screen buttons 56 adapted to be actuated by a player. A player can operate or interact with the wagering game using these touch screen buttons or other input devices such as the buttons 20 shown in FIG. 9. The CPU operate(s) to execute a wagering game program causing the primary display area 12 or the secondary display area 14 to display the wagering game.

In response to receiving a wager, the reels 52 are rotated and stopped to place symbols on the reels in visual association with paylines such as paylines 58. The wagering game evaluates the displayed array of symbols on the stopped reels and provides immediate awards and bonus features in accordance with a pay table. The pay table may, for example, include “line pays” or “scatter pays.” Line pays occur when a predetermined type and number of symbols appear along an activated payline, typically in a particular order such as left to right, right to left, top to bottom, bottom to top, etc. Scatter pays occur when a predetermined type and number of symbols appear anywhere in the displayed array without regard to position or paylines. Similarly, the wagering game may trigger bonus features based on one or more bonus triggering symbols appearing along an activated payline (i.e., “line trigger”) or anywhere in the displayed array (i.e., “scatter trigger”). The wagering game may also provide mystery awards and features independent of the symbols appearing in the displayed array.

In accord with various methods of conducting a wagering game on a gaming system in accord with the present concepts, the wagering game includes a game sequence in which a player makes a wager and a wagering game outcome is provided or displayed in response to the wager being received or detected. The wagering game outcome is then revealed to the player in due course following initiation of the wagering game. The method comprises the acts of conducting the wagering game using a gaming apparatus, such as the wagering game machine 10 depicted in FIG. 9, following receipt of an input from the player to initiate the wagering game. The wagering game machine 10 then communicates the wagering game outcome to the player via one or more output devices (e.g., primary display 12 or secondary display 14) through the display of information such as, but not limited to, text, graphics, static images, moving images, etc., or any combination thereof. In accord with the method of conducting the wagering game, the CPU transforms a physical player input, such as a player’s pressing of a “Spin Reels” touch key, into an electronic data signal indicative of an instruction relating to the wagering game (e.g., an electronic data signal bearing data on a wager amount).

In the aforementioned method, for each data signal, the CPU (e.g., CPU 830 of FIG. 8) is configured to process the electronic data signal, to interpret the data signal (e.g., data signals corresponding to a wager input), and to cause further actions associated with the interpretation of the signal in accord with computer instructions relating to such further actions executed by the controller. As one example, the CPU causes the recording of a digital representation of the wager in one or more storage media (e.g., storage unit 844), the CPU, in accord with associated computer instructions, causing the changing of a state of the storage media from a first state to a second state. This change in state is, for example, effected by changing a magnetization pattern on a magnetically coated surface of a magnetic storage media or changing a magnetic state of a ferromagnetic surface of a magneto-optical disc storage media, a change in state of transistors or capacitors in a volatile or a non-volatile semiconductor memory (e.g., DRAM), etc. The noted second state of the data storage media comprises storage in the storage media of data representing the electronic data signal from the CPU (e.g., the wager in the present example). As another example, the CPU further, in accord with the execution of the instructions relating to the wagering game, causes the primary display, other display device, or other output device (e.g., speakers, lights, communication device, etc.) to change from a first state to at least a second state, wherein the second state of the primary display comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of computer instructions relating to the wagering game is further conducted in accord with a random outcome (e.g., determined by a RNG) that is used by the CPU to determine the outcome of the game sequence, using a game logic for determining the outcome based on the randomly generated number. In at least some aspects, the CPU is configured to determine an outcome of the game sequence at least partially in response to the random parameter.

General

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments of the invention, which are defined only by the appended claims. Each of the embodiments described herein are contemplated as falling within the inventive subject matter, which is set forth in the following claims.

The invention claimed is:

1. A computerized method comprising:

presenting, via at least one of one or more electronic processors, a community game on a display device of a wagering game system that comprises a wagering game machine associated with a handheld device for use in conducting the community game, wherein the presenting of the community game comprises presenting movements of a game element in response to movements of the handheld device, wherein the wagering game machine includes a money input device configured to receive physical money, wherein a value for the physical money is added to a credit balance for placement of one or more wagers on the community game, and wherein the game element is presented, at least in part, in response to the one or more wagers; and at periodic time intervals during the community game, storing, via at least one of the one or more electronic processors, in a memory device, data indicating a current position of the handheld device.

2. The computerized method of claim 1, wherein the periodic time intervals are defined independent of game events of the community game.

3. The computerized method of claim 1, further comprising storing, in the memory device, game events of the community game.

4. The computerized method of claim 3, wherein the handheld device comprises a button, wherein the game events comprise data indicating actuation of the button.

5. The computerized method of claim 3, further comprising storing, in response to the game events of the community game, data indicating the current position of the handheld device.

6. The computerized method of claim 1, wherein the data indicating the current position of the handheld device comprises data indicating a location and an orientation of the handheld device in three-dimensional space.

7. The computerized method of claim 3, further comprising:

replaying, on the display device, the community game based on the game events and the data indicating the current position of the handheld device.

8. The computerized method of claim 7, wherein the replaying of the community game is without video captured during the presenting the community game on the display device.

9. A gaming system comprising:

one or more display devices;

a money input device;

a handheld device including a sensor configured to detect inputs for a community game occurring during a wagering game;

one or more memory devices; and one or more processors configured to execute instructions to cause the gaming system to detect movements of the handheld device, wherein the money input device is configured to receive physical money, wherein a value for the physical money is added to a credit balance for placement of one or more wagers on the community game, and wherein a game element is presented, at least in part, in response to the one or more wagers, present, in response to the movements of the handheld device, movements of the game element in the community game on the one or more display devices, and at periodic time intervals during the community game, store, in the one or more memory devices, data that indicates a current position of the handheld device.

10. The gaming system of claim 9, wherein the periodic time intervals are defined independent of game events of the community game.

11. The gaming system of claim 9, wherein the one or more processors are configured to execute instructions to cause the gaming system to store game events of the community game.

12. The gaming system of claim 11, wherein the one or more processors are configured to execute instructions to cause the gaming system to:

replay, on the one or more display devices, the community game based on the game events and the data indicating the current position of the handheld device.

13. The gaming system of claim 12, wherein the one or more processors are configured to execute instructions to cause the gaming system to replay the community game without video recorded during the community game.

14. The gaming system of claim 9, wherein the one or more processors are configured to execute instructions to cause the gaming system to store, in the one or more memory devices, the current position of the handheld device in response to game events of the community game.

15. A community gaming system comprising:

a first wagering game machine including one or more first display devices configured to display a first wagering game;

a second wagering game machine including one or more second display devices configured to display a second wagering game, wherein one or more of the first wagering game machine or the second wagering game machine includes a money input device configured to receive physical money, wherein a value for the physical money is added to a credit balance for placement of one or more wagers on a community game, and wherein one or more of a first game element or a second game element is presented, at least in part, in response to the one or more wagers;

one or more community game display devices configured to display the community game that is initiated during play of the first wagering game and the second wagering game;

a first handheld device associated with the first wagering game machine, wherein the first handheld device includes at least one first sensor configured to detect movements of the first handheld device at periodic intervals during the community game;

a second handheld device associated with the second wagering game machine, wherein the second handheld device includes at least one second sensor configured to detect movements of the second handheld device at the periodic intervals during the community game;

a community game presentation unit configured to present, on the one or more community game display devices, video of the community game, wherein the video includes movements of the first game element in response to the movements of the first handheld device, and wherein the video includes movements of the second game element in response to the movements of the second handheld device; and a game history recorder unit configured to store, in a memory device, data indicating positions of the first handheld device and data indicating positions of the second handheld device.

16. The community gaming system of claim 15, wherein the data indicating the positions of the first handheld device comprises data indicating locations and orientations of the first handheld device in three-dimensional space, and wherein the data indicating the positions of the second handheld device comprises data indicating locations and orientations of the second handheld device in three-dimensional space.

17. The community gaming system of claim 15, wherein the at least one first sensor is configured to detect first inputs to the community game from the first handheld device, wherein the at least one second sensor is configured to detect second inputs to the community game from the second handheld device, and wherein the game history recorder unit is configured to store the first inputs and the second inputs.

18. The community gaming system of claim 15, wherein the game history recorder unit is further configured to store the data indicating the positions of the first handheld device and the data indicating the positions of the second handheld device during periodic time intervals independent of game events of the community game.

19. One or more machine-readable storage devices including instructions which, when executed by one or more processors, cause the one or more processors to perform operations for replaying a community game, the operations comprising:

receiving game data for creating video for a replay of the community game, wherein the community game is presented via a wagering game machine that includes a money input device configured to receive physical money, wherein a value for the physical money is added to a credit balance for placement of one or more wagers on the community game;

receiving recorded data indicating positions of a handheld device used in playing the community game, wherein the recorded data indicating the positions of the handheld device was recorded at periodic intervals during an earlier presentation of the community game; and presenting, on a display device, the replay of the community game based on the game data and the recorded data indicating the positions of the handheld device.

20. The one or more machine-readable storage devices of claim 19, wherein the one or more processors are to perform operations comprising:

retrieving recorded data of positions of the handheld device that was recorded in response to game events of the community game.

21. The one or more machine-readable storage devices of claim 20, wherein the presenting the replay of the community game comprises presenting the replay of the community game based on the recorded data of the positions of the handheld device that was recorded in response to the game events of the community game.

22. The one or more machine-readable storage devices of claim 19, wherein the periodic intervals are defined independent of game events of the community game.

23. The one or more machine-readable storage devices of claim 19, wherein the presenting the replay of the community game is without video captured during presenting of the community game on the display device during a live play of the community game.

24. An apparatus comprising:

one or more processors;

one or more machine-readable storage devices configured to store:

first instructions that when executed by the one or more processors cause the apparatus to present a community game on a display device of a wagering game system that includes a wagering game machine and a handheld device, wherein presentation of the community game includes presentation of movements of a game element in response to movements of the handheld device, wherein the wagering game machine includes a money input device configured to receive physical money, wherein a value for the physical money is added to a credit balance for placement of one or more wagers on the community game, and wherein the game element is presented, at least in part, in response to the one or more wagers; and second instructions that when executed by the one or more processors, cause the apparatus to periodically, during the community game, store, in a memory device, data indicating a current position of the handheld device.

25. The apparatus of claim 24, wherein storage of the data indicating the current position of the handheld device occurs independent of game events of the community game.

26. The apparatus of claim 24, wherein the one or more machine-readable storage devices are configured to store third instructions that when executed by the one or more processors cause the apparatus to store, in the memory device, game events of the community game.

* * * * *